Aug. 30, 1949.   A. E. WILSON ET AL   2,480,801
TRANSMISSION OPERATING MECHANISM
Original Filed Sept. 11, 1944   2 Sheets-Sheet 1

INVENTOR.
HENRY D. HUKILL
ALBERT E. WILSON
BY
H. O. Clayton
ATTORNEY

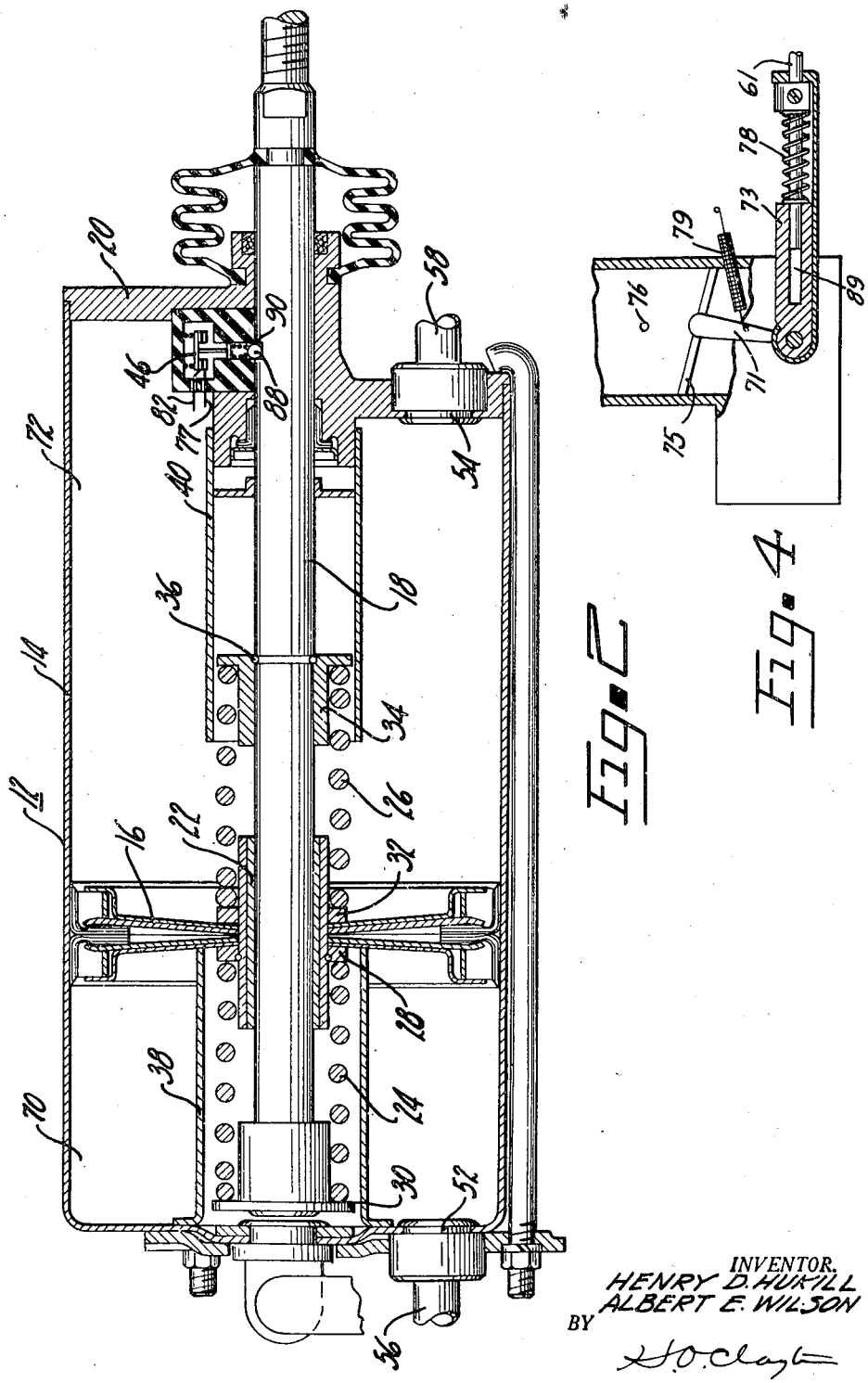

Patented Aug. 30, 1949

2,480,801

UNITED STATES PATENT OFFICE 2,480,801

TRANSMISSION OPERATING MECHANISM

Albert E. Wilson, Cleveland, Ohio, and Henry D. Hukill, South Bend, Ind., assignors to Bendix Aviation Corporation, South Bend, Ind., a corporation of Delaware Original application September 11, 1944, Serial No. 553,524. Divided and this application October 26, 1945, Serial No. 624,656

7 Claims. (Cl. 74—472)

This invention relates in general to gear shifting mechanism and is of particular utility when employed in connection with speed-changing and direction-reversing gearing commonly used in coupling the internal combustion engine of an automotive vehicle or a tank with the driving vehicle wheels or other propelling devices.

One object of our invention is to provide power means for operating a two-speed transmission gear mechanism said mechanism being operably associated with a differential mechanism of standard construction and mounted adjacent thereto in the power plant of the vehicle. In other words, it is an object of our invention to provide power means for operating the two-speed axle mechanism of the day.

Yet another object of our invention is to provide power means for operating a two-speed axle said power means being controlled by an operation of the accelerator and an operation of a manually operated selector valve.

A further object of our invention is to provide power means for operating a change-speed transmission, such as the selective gear transmission located immediately to the rear of the clutch mechanism or a two-speed axle mechanism, said power means including a spring and vacuum operated double-acting motor the operation of which is controlled by the operation of a manually operated four-way or double three-way selector valve and the operation of the accelerator of the vehicle in its control of the speed of the engine and the degree of gaseous pressure within the intake manifold of said engine.

An important object of our invention is to provide, in a power plant of an automotive vehicle, power means for moving, to one or the other of two positions, a gear shifting member of a change-speed transmission mechanism said power means including a motor the power element of which is connected to said gear shifting member by force transmitting means, including a yieldable means, having three distinct stages of operation, said power means being controlled by (1) the operation of a manually operated four-way or double three-way selector valve (2) the operation of the acclerator of the vehicle in its control of the speed of the engine, the degree of gaseous pressure within the intake manifold of the engine and its control of a switch constituting a part of means for momentarily disabling the ignition system of the engine, and (3) an ignition interrupter switch actuated by means connected with the power element of the motor.

In brief, the most important object of our invention is to provide power means for effecting, in three stages, one or the other of two operations of the transmission of an automotive vehicle the second stage of said operation being facilitated by momentarily disabling the ignition system of said vehicle; and the latter feature is disclosed in our application Serial No. 553,524, filed September 11, 1944 the instant application being a division thereof.

Yet another object of our invention is to provide, in the power plant of an automotive vehicle, power means for moving to one or the other of two positions a gear shifting member of a change-speed transmission of the vehicle said power means including a motor the power element of which is connected to said gear shifting member by force transmitting means having three distinct stages of operation and including yieldable means, said power means being controlled by (1) the operation of a manually operated four-way selector valve and (2) the operation of the accelerator of the vehicle in its control of the throttle valve of the engine of the vehicle.

One of the features of our invention is to provide a double-acting pressure differential operated motor for establishing a change-speed transmission in one or the other of two settings said motor being connected with said transmission by means including a double-acting yieldable means which is energized, that is cocked, during the first half of the gear shifting movement of the power element of said motor said yieldable means being then operative, after said power element has completed its gear shifting movement to neutralize the transmission, to establish the transmission in gear.

Yet another object of our invention is to provide power means for operating the two-speed axle of an automotive vehicle said power means including a double-acting vacuum motor comprising a casing member detachably secured to the casing of the two-speed axle and further comprising a power element operably connected to a shift fork or equivalent element of the axle mechanism. The force transmitting means interconnecting the shift fork and power element includes a double-acting yieldable means which is of such a strength that the same is cocked, that is the yieldable means is made a source of potential energy, when the vacuum motor is energized to effect an operation of the axle mechanism, said operation being effected prior to the neutralization of the axle mechanism which is effected during the last part of the movement of the power element of said motor, the cocked yieldable means then functioning, after the gears of the axle mechanism to be meshed are brought to synchronous speeds by controlling the speed of the engine of the vehicle, to expand thereby effecting a new setting of the axle mechanism.

One of the objects of our invention is to provide, in an automotive vehicle including an internal combustion engine controlled in part by an accelerator operated throttle valve, power means for effecting one or the other of two settings of the change-speed transmission of said vehicle said power means including a double-acting motor the power element of which is connected to the transmission by force transmitting means operating in three distinct stages to shift the transmission from one setting to the other, the operation of the power means being controlled by an operation of the throttle valve and a manually operated or controlled selector valve.

Other objects of the invention and desirable details of construction will become apparent from the detailed description of certain embodiments of the invention described in the specification to follow and disclosed in the accompanying drawings in which:

Figure 2 is a sectional view disclosing the spring and pressure differential operated motor of that embodiment of our invention disclosed in Figure 1;

Figure 4 is a diagrammatic view disclosing details of the connection between the throttle and the accelerator.

Figure 1:
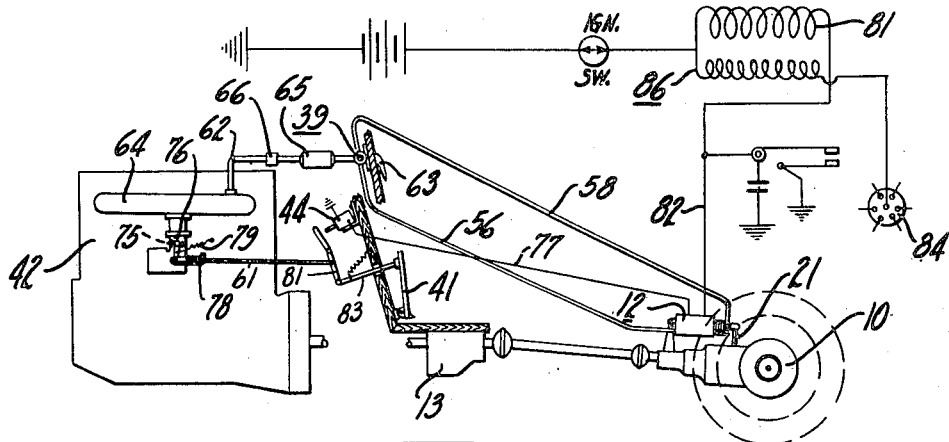
Figure 1 is a diagrammatic view disclosing the preferred embodiment of our invention serving to operate two-speed rear axle of an automotive vehicle.

Referring now to Figure 1 disclosing one embodiment of our invention a rear axle, generally indicated by the reference numeral 10, is of the two-speed type and the change from one axle speed to another is effected by means of a double-acting double-ended spring and pressure differential operated motor 12 which may be secured to the axle housing or any other suitable mounting. It is to be understood however that our invention is not necessarily limited to means for operating a two-speed axle; for the double-acting motor 12 of our invention may also be used to operate any multi-speed transmission mechanism i. e. the change gear transmission 13, to establish one or the other of two settings thereof.

The motor 12 comprises a double-ended casing 14, Figure 2, and a piston, that is, power element 16 the latter being connected to the axle mechanism by a three stage force transmitting means which constitutes an important feature of our invention.

Referring now to Figure 2 the force transmitting means disclosed in this figure includes a rod 18 slidably mounted in an end plate 20 of the motor 12 said rod being operably connected at one of its ends to a crank, not shown, extending from the upper end of a shaft 21, Figure 1. This shaft is connected to the shifter fork or equivalent means within the casing of the transmission 10 said means when actuated serving to so operate the transmission as to establish the same in one or the other of its two settings. A hub portion 22 of the piston 16 is sleeved over the rod 18 and slidable thereon; and said hub 22 is operably connected to said rod by means of yieldable means of a certain strength. In that embodiment of our invention disclosed in Figure 2 this yieldable means consists of two springs 24 and 26 sleeved over the rod 18 said springs preferably being of equal or substantially equal strength. The spring 24, which constitutes a part of the force transmitting means interconnecting the piston 16 and transmission, is interposed between a flange portion 28 of the hub 22 and a flange 30 at the end of and fixedly secured to the rod 18. The spring 26 is interposed between a flange 32, constituting a part of the hub 22, and a sleeve member 34 said sleeve constituting in effect a portion of the rod 18. Movement of the latter member to the right, Figure 2, is prevented by a stop ring 36 embedded in the rod 18. Tubular members 38 and 40, fixedly secured at their outer ends to the end plates of the motor casing, serve as stop members to limit the movement of the piston 16.

The most important features of our invention are disclosed in Figure 1 wherein the operation of the motor 12 is controlled by (1) a four-way selector valve 39 (2) the throttle operating accelerator 41 which in large measure controls the operation of the internal combustion engine 42 of the vehicle (3) an accelerator operated ignition controlling breaker switch 44 which is closed when the accelerator is fully depressed and (4) an ignition controlling switch 46, Figure 2, which is actuated by the rod 18.

Figure 3:
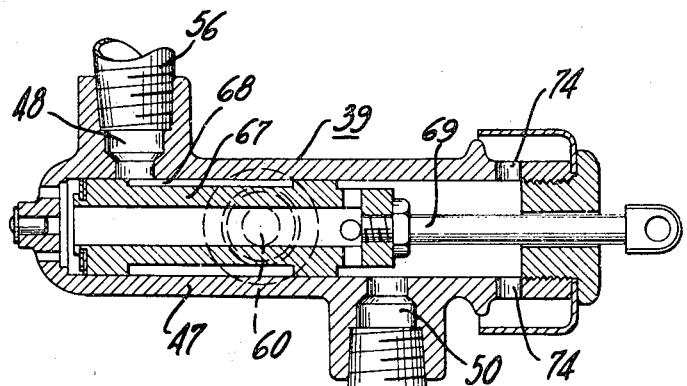
Figure 3 is a sectional view of the double three-way selector valve of our invention.

Referring now to the four-way valve 39 disclosed in detail in Figure 3 the same comprises a hollow casing 47 provided with ports 48 and 50 connected respectively with ports 52 and 54 in the ends of the motor 12 by means of conduits 56 and 58. The casing 47 is also ported at 60 to receive a conduit 62 connected to the intake manifold 64 of the engine. A vacuum tank 65 is incorporated in this conduit and a check valve 66 is incorporated in that portion of the conduit interconnecting the tank with the manifold. This check valve insures the maintenance of the relatively low gaseous pressure within the tank when the accelerator is depressed which operation increases the gaseous pressure in the intake manifold. A spool shaped valve member 67 is slidably mounted within the casing 47. A recess 68 of said member serving to interconnect the ports 60 and 48 when the valve member is moved, by a manually operated selector lever 63, to its high gear position said position of the valve member being disclosed in Figure 3. The selector lever 63 is connected by suitable means, not shown, to a rod 69 which is preferably adjustably connected to the valve member 67.

When the above described high gear setting of the valve 39 is selected by the driver then a compartment 70 of the motor 12, outlined by the piston 16 and a part of the casing 14, is placed in air transmitting connection with the intake manifold 64 via the conduit 62, check valve 66, vacuum tank 65, valve port 60, the recess 68, port 48 and the conduit 56. At this time a compartment 72 of the motor is vented to the atmosphere via ports 74 in the valve casing 47, the interior of the valve, port 50 and the conduit 58. It follows therefore that the piston 16 is then subjected to a differential of pressures forcing the same to the left, Figure 2, to initiate the high gear operation of the spring and vacuum operated motor.

It will be assumed, for the purposes of this description, that this high gear setting of the valve 39 is effected after the vehicle has attained the desired speed with the transmission 10 established in its low gear setting. The driver will then probably wish to shift the transmission 10 into its high gear setting to thereby reduce the speed of the engine with the attendant saving of engine fuel and reduction of wear. Continuing the description of the operation of establishing the transmission in its high gear setting when the high gear setting of the valve 39 is effected the piston 16, as previously described, is subjected to a differential of pressures moving the same to the left, Figure 2. It will be assumed that the driver at this time is maintaining the accelerator at least partially depressed to maintain the road speed of the vehicle and effect a partial vacuum in the intake manifold. If the tank 65 were omitted the motor compartment 70 would be partially evacuated despite the absence of said tank however by incorporating said tank and the check valve in the conduit 62 there is insured a substantially constant source of vacuum to make possible an energization of the motor 12 whenever the valve 39 is operated and irrespective of the position of the accelerator. The aforementioned high gear operation or setting of the valve 39 is what may be termed a preselecting operation, that is, the valve is operated prior to the hereinafter described operation of the accelerator. Now with this operation and the resultant vacuum energization of the motor 12, there results a compression of the spring 24 until the same goes solid or substantially solid. In other words, the spring 24 is then said to be cocked, that is, potential energy is stored in the same. This cocking of the spring 24 is effected inasmuch as the rod 18 is then held immobile due to the then existing driving load on the teeth of the low speed transmission gears. With this spring cocking operation, which may be defined as a first stage operation of the power means, the piston 16 moves to a position half way or substantially half way between the inner end of one or the other of the stops 38 and 40 there being no movement of the rod 18 for reasons explained above.

The driver, to complete the operation of establishing the transmission in its high gear setting, may then release the accelerator to idle the engine, that is, reverse its driving torque; and with this operation, with the resultant removal of the driving load upon the low speed gears of the transmission, there results a bottoming operation of the piston 16, that is, said piston resumes its movement to the left, Figure 2, to abut the stop 38. Now with this operation the rod 18, through the intermediary of the then cocked spring 24, is moved to the left to effect the second stage operation of the power means; and this operation effects a demeshing of the low speed gears of the transmission, the transmission being established in its neutral setting.

The third, that is, last stage of operation of the power means to establish the transmission in its high gear setting is effected by an expanding operation of the spring 24; and this operation takes place immediately after the gears to be meshed have been synchronized. This synchronization will of course be effected when the engine and the force transmitting means interconnecting the same with the driving gear of the high speed gears have slowed down to a speed to make possible a meshing of said gears.

There is thus provided a pressure differential and spring operated power means, controlled by the accelerator and the valve 39, and operable to shift the transmission 10 from a low speed setting to a high speed setting in three distinct stages of operation.

After the transmission 10 is established in its high gear setting the driver will then depress the accelerator to either maintain or increase the road speed of the vehicle as desired.

Should the driver then wish to establish the transmission in its low gear setting say to facilitate the operation of passing a car on the road or to climb a hill he need but operate the valve 39 to establish the same in its low gear setting, and, with the control mechanism disclosed in the drawings, either release or fully depress the accelerator. When the valve 39 is placed in its low gear setting the compartment 72 is placed in communication with the vacuum tank 65 and the compartment 70 is vented to the atmosphere. The piston 16 then moves to the right, Figure 2, to cock, that is, render solid the spring 26 thereby completing the first stage of the low gear operation of the transmission operating mechanism. The driver will then complete the operation of establishing the transmission in its low gear setting by either fully depressing the accelerator to close the breaker switch 44 or by releasing the accelerator, both operations resulting in a reversal of the engine torque. If the accelerator is fully depressed, an operation which the driver would naturally effect when he wishes to pass a car on the road, then after the throttle valve 75 is completely opened to abut a stop 76 a spring 78 in the connection between the accelerator and throttle will collapse; and during this collapsing operation the switch 44 is closed. It follows that the spring 78 is stronger than a throttle return spring 79 the latter being connected to a throttle operating lever 71. As is disclosed in Figure 4 the spring 78 is sleeved over a rod 61 which is slidably received within a slot 89 in a member 73. The member 73 is pivotally connected to the throttle operating lever 71 and the rod 61 is pivotally connected to lever 81. The latter is pivotally connected, by a link 83, to the accelerator 41; and as is described above the lever 81 is operative to close the switch 44 when the accelerator is depressed beyond its full throttle open position. As disclosed in Figure 1 the switch 44 is grounded and is connected by a wire 77, in series with the ignition interrupter switch 46, Figure 2, which is closed when the transmission is established in its high gear setting that is when the rod 18 is in its high gear position. When the transmission is established in its high gear setting the motor parts are positioned as disclosed in Figure 2.

A wire 82, leading from the switch 46, is connected to the distributor 84 of the conventional ignition system of the engine, all as is disclosed in Figure 1. It follows that when the switches 44 and 46 are both closed the primary winding 81 of the ignition coil 86 is grounded thereby disabling the ignition system. This disabling of the ignition system disables the engine and reverses the driving torque upon the high speed gears of the transmission; and this operation makes possible the second stage operation of the power means, that is, the bottoming movement of the piston 16 and the concurrent movement of the rod 18 to neutralize the transmission. The motor 12 is at this time vacuum energized to effect this operation by virtue of the inclusion in the vacuum system of the vacuum storage tank 65; for if the tank were not incorporated in the vacuum conduit 62 the vacuum within the manifold would be destroyed when the accelerator is fully depressed. Now it is to be noted that the interruption of the ignition is only momentary to effect this neutralizing operation of the transmission by virtue of the fact that when the rod 18 is moved to the right, Figure 2, a ball 88 of the ignition interrupter switch 46 is moved upwardly out of a recess 90; and this operation of the ball serves to open the switch 46.

As to the third stage of operation of the power means to effect the meshing of the low speed gears of the transmission this operation of said power means is effected when the engine has been speeded up sufficiently to effect the necessary synchronization of the low speed gears. This operation is quickly effected inasmuch as it is to be remembered that the throttle is at this time wide open.

If the driver wishes to effect the low gear setting of the transmission without disabling the ignition system he need but release the accelerator and place the valve 39 in its low gear setting. The above described three stages of operation of the power means is then effected inasmuch as the reversal of the engine torque by the release of the accelerator will effect the demeshing of the high speed gears to neutralize the transmission and the subsequent depression of the accelerator to speed up the engine will effect the necessary synchronization of the low speed gears to make possible the third stage of operation of the power means.

There is thus provided a very simple yet efficient three-stage transmission-operating mechanism controlled by the accelerator and a selector valve and operating to establish one or the other of two settings of a change-speed transmission mechanism irrespective of where said mechanism is incorporated in the power plant of the vehicle.

An important feature of our invention lies in the construction and arrangement of the motor 12 and the force-transmitting means, particularly the yieldable means, interconnecting the power element of said motor with the transmission. This yieldable means, which is in series with the power element in said force-transmitting means, is of such a strength that its condition is changed, that is, potential energy is stored therein, when the selector valve is operated; and the strength of said yieldable means is such that this potential energy storing operation constitutes the first of three stages of operation of the aforementioned force transmitting means. With the shifter mechanism of our invention the transmission is operated quickly and quietly there being no clashing of gears; furthermore the control of the mechanism is so simple that it is submitted that the entire operation is practically fool proof.

In conclusion, it is to be stressed that the heart of our invention lies in the provision of the ignition controlling means, including the switches 44 and 46, to effect the second stage of operation of the three-stage operating shifter mechanism of our invention; and this ignition controlling means, constituting an engine torque controlling means, supplements the operation of the throttle as a torque controlling means.

We claim:

1. In a motor vehicle provided with an internal combustion engine having an intake manifold, an accelerator, an engine controlling ignition system and a change-speed transmission, power means for operating the transmission and in part controlling the operation of the ignition system to facilitate a certain operation of the transmission, said power means including a fluid pressure operated motor comprising a casing and a power element housed within said casing and operably connected to a torque transmitting element of the transmission, a valve for controlling the operation of said motor, manually controlled means for operating said valve, fluid transmitting means interconnecting the intake manifold, valve and motor, an ignition interrupter switch, switch and transmission operating force transmitting means interconnecting the power element and torque transmitting element of the transmission said force transmitting means, including yieldable means of a certain strength, being operable in three distinct stages, and electrical means cooperating with said ignition interrupter switch to provide a means for cutting the ignition system into or out of operation said electrical means including an accelerator operated switch; the parts of the power means being so constructed and arranged and so operative as to effect, after a certain operation of the valve, an energization of the motor to effect a movement of the power element resulting in an operation of the yielding means, that is, the first stage of operation of the force transmitting means, to make of the yieldable means a source of potential energy, the power means being then operative, when the accelerator is actuated to effect a certain operation of the switch operated thereby, to effect the second stage operation of the force transmitting means to neutralize the transmission, said power means being then operative, after certain gears of the transmission have been synchronized by the operation of the accelerator to speed up the engine, to effect the third stage of operation of the force transmitting means, that is, the meshing of certain gears of the transmission to establish the same in another setting.

2. In an automotive vehicle provided with an internal combustion engine, an accelerator, a change-speed transmission, force transmitting means interconnecting the engine and transmission and an ignition system for in part controlling the operation of the engine, power means for operating the transmission and in part control the operation of the ignition system to facilitate a certain operation of the transmission said power means comprising a fluid pressure motor comprising a casing and a power element, a three-stage operating force transmitting means, including a yieldable means of a certain strength, interconnecting the power element and transmission, a manually controlled valve for controlling the operation of said motor, an ignition interrupter switch operated in part by a portion of said force transmitting means, other electrical means, including a grounded accelerator operated switch and a wire connected to the distributor of the ignition system, cooperating with said latter switch, said switches, when both are closed, completing a ground connection with the distributor; the parts of said power means being so constructed and arranged and so operative that the first stage operation of said force transmitting means, that is, the operation effecting a compression of the yieldable means, is effected by the motor as a result of an operation of the control valve, the second stage operation of the force transmitting means, to effect a neutralization of the transmission, is effected by a reversal of the engine torque by either releasing the accelerator or fully depressing the same to close the accelerator operated switch and the third stage operation of the force transmitting means is effected when the gears of the transmission to be meshed are synchronized said operation being effected by a speeding up of the engine by virtue of the opening of the throttle when the accelerator is depressed to close the accelerator operated switch or by virtue of a depression of the accelerator to open the throttle after the accelerator is released to reverse the engine torque.

3. In an automotive vehicle provided with a change-speed transmission, an accelerator and an ignition system; power means for operating the transmission to establish the same in one or the other of two settings said power means comprising a double-acting pressure-differential operated motor operably connected to the transmission by force transmitting means, including yieldable means capable of being compressed by a force which is less than the force developed by the power element of said motor, operable in three distinct stages when the power means is operative to change the setting of the transmission, valve means for controlling the operation of said motor, and electrical means controlled by an operation of the accelerator and the aforementioned motor and operative to so control the operation of the ignition system as to make possible the second stage of operation of the aforementioned three-stage force transmitting means.

4. In an automotive vehicle provided with a change-speed transmission, an internal-combustion engine controlled in part by a throttle valve, an ignition system, and a throttle operating accelerator; power means for operating the transmission to effect at least two different settings thereof, said power means comprising a double-acting pressure-differential operated motor, force transmitting means, operable in three distinct stages, interconnecting the power element of the motor and the transmission, valve means for controlling the operation of said motor and electrical means, including a switch operated by the motor and a switch operated by the accelerator, for controlling the operation of the ignition system; the parts of the aforementioned mechanism being so constructed and arranged and so operative that to effect a three-stage operation of the force transmitting means to effect one of the aforementioned two settings of the transmission the valve is first operated, the throttle is then closed by releasing the accelerator to thereby reverse the engine torque, and the accelerator is then depressed to speed up the engine; the parts of the aforementioned mechanism being also so constructed and arranged and so operative that to effect a three-stage operation of the force transmitting means to effect the other of the aforementioned two settings of the transmission the valve is first operated and the accelerator is then depressed to close the accelerator operated switch and to speed up the engine.

5. In an automotive vehicle provided with a change-speed transmission, an accelerator and an ignition system for in part controlling the operation of the internal combustion engine of the vehicle; power means for operating the transmission to effect two different settings thereof, said power means comprising a double-acting pressure-differential operated motor, force transmitting means, operable in three distinct stages, interconnecting the power element of said motor and the transmission and means for controlling the operation of said motor and force transmitting means to effect the aforementioned three stages of operation of the latter means, said control means including a manually operated four-way selector valve, a normally open grounded switch adapted to be operated by the accelerator, that is, closed when the accelerator is fully depressed, a switch mechanism constructed to be closed when the power element of the motor is in one of its gear establishing positions, and electrical conductor means interconnecting the aforementioned two switches and the primary winding of the ignition coil of the ignition system.

6. In an automotive vehicle provided with a change speed transmission, an accelerator and an ignition system; power means for operating the transmission to establish the same in one of the other of two settings said power means comprising a double acting pressure differential operated motor operably connected to the transmission by force transmitting means, including yieldable means capable of being compressed by a force which is less than the force developed by the power element of said motor, operable in a plurality of stages when the power means is operative to change the setting of the transmission, valve means for controlling the operation of said motor, and electrical means controlled by an operation of the accelerator and the aforementioned motor and operative to so control the operation of the ignition system as to make possible one of the stages of operation of the force transmitting means in the operation of establishing the transmission in one of the aforementioned two settings.

7. In an automotive vehicle provided with a change-speed transmission, an accelerator, and an ignition system; power means for operating the transmission to establish the same in one or the other of two settings, said power means comprising a double acting fluid pressure operating motor operably connected to the transmission by force transmitting means, including yieldable means of a certain strength, operable in a plurality of stages when the power means is operative to change the setting of the transmission, valve means for controlling the operation of said motor, manually operated means, conveniently mounted within reach of the driver, for operating the valve, and electrical means controlled by an operation of the accelerator and the aforementioned motor and operative to so control the operation of the ignition system as to make possible one of the stages of operation of the force transmitting means in the operation of establishing the transmission in one of the aforementioned two settings.

ALBERT E. WILSON.
HENRY D. HUKILL.

REFERENCES CITED

The following references are of record in the file of this patent:

UNITED STATES PATENTS

| Number | Name | Date |
| --- | --- | --- |
| 2,225,493 | Barnes | Dec. 17, 1940 |
| 2,333,668 | Neracher et al. | Nov. 9, 1943 |
| 2,373,259 | Price | Apr. 10, 1945 |
| 2,398,407 | Brownyer | Apr. 16, 1946 |